US011840320B2

(12) United States Patent
Perry et al.

(10) Patent No.: US 11,840,320 B2
(45) Date of Patent: Dec. 12, 2023

(54) USE OF HYDROGEN AND LIQUID NATURAL GAS HYBRID FUEL IN MARINE APPLICATIONS TO REDUCE CARBON FOOTPRINT

(71) Applicant: BLOOM ENERGY CORPORATION, San Jose, CA (US)

(72) Inventors: Martin Perry, Mountain View, CA (US); Carl Cottuli, Franklin, MA (US); Suminderpal Singh, Fremont, CA (US); K. R. Sridhar, Los Gatos, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 17/484,446

(22) Filed: Sep. 24, 2021

(65) Prior Publication Data

US 2022/0097817 A1 Mar. 31, 2022

Related U.S. Application Data

(60) Provisional application No. 63/083,179, filed on Sep. 25, 2020.

(51) Int. Cl.
*B63H 21/20* (2006.01)
*F02M 25/12* (2006.01)
*F02B 43/10* (2006.01)
*F02D 19/06* (2006.01)

(52) U.S. Cl.
CPC ............ *B63H 21/20* (2013.01); *F02B 43/10* (2013.01); *F02D 19/0644* (2013.01); *F02D 19/0647* (2013.01); *F02M 25/12* (2013.01); *B63H 2021/202* (2013.01); *F02B 2043/103* (2013.01); *F02B 2043/106* (2013.01)

(58) Field of Classification Search
CPC ...... F02M 25/12; F02D 19/0644; B63H 21/20
See application file for complete search history.

(56) References Cited

U.S. PATENT DOCUMENTS

| 7,364,810 B2 | 4/2008 | Sridhar et al. |
| 7,482,078 B2 | 1/2009 | Sridhar et al. |
| 7,878,280 B2 | 2/2011 | Sridhar et al. |

(Continued)

FOREIGN PATENT DOCUMENTS

| EP | 3106638 A1 * | 12/2016 | ............. F01N 3/105 |
| JP | 2001-085036 A | 3/2001 | |

(Continued)

OTHER PUBLICATIONS

Notification of Transmittal of the International Search Report and the Written Opinion of the International Searching Authority for International Patent Application No. PCTUS2021/051926, dated Jan. 5, 2022, 9 pages.

(Continued)

*Primary Examiner* — Kevin A Lathers
(74) *Attorney, Agent, or Firm* — THE MARBURY LAW GROUP PLLC

(57) ABSTRACT

A method of operating a vessel includes providing hydrogen or a fuel mixture containing hydrogen and a hydrocarbon fuel to a power generator disposed on the vessel, and providing power from the power generator to an electrical load of the vessel.

16 Claims, 2 Drawing Sheets

(56) References Cited

U.S. PATENT DOCUMENTS

| | | |
|---|---|---|
| 8,211,583 B2 | 7/2012 | Weingaertner et al. |
| 9,190,673 B2 | 11/2015 | Venkataraman et al. |
| 10,756,546 B2 | 8/2020 | Pmsvvsv et al. |
| 2004/0202914 A1 | 10/2004 | Sridhar et al. |
| 2005/0048334 A1 | 3/2005 | Sridhar et al. |
| 2007/0196702 A1* | 8/2007 | Sridhar .................. C25B 1/02 429/421 |
| 2009/0280360 A1 | 11/2009 | Weingaertner et al. |
| 2012/0178003 A1 | 7/2012 | Venkataraman et al. |
| 2019/0052094 A1 | 2/2019 | Pmsvvsv et al. |
| 2020/0303758 A1 | 9/2020 | Karuppaiah et al. |
| 2020/0328445 A1 | 10/2020 | Weingaertner et al. |
| 2021/0020974 A1 | 1/2021 | Ballantine et al. |

FOREIGN PATENT DOCUMENTS

| | | |
|---|---|---|
| KR | 10-2011-0048214 A | 5/2011 |
| KR | 2011048214 A * | 5/2011 |
| KR | 10-1259820 B1 | 4/2013 |
| WO | WO2019-181301 A1 | 9/2019 |
| WO | WO2020-157346 A1 | 8/2020 |

OTHER PUBLICATIONS

U.S. Appl. No. 17/231,575, filed Apr. 15, 2021, Bloom Energy Corporation.

U.S. Appl. No. 63/133,855, filed Jan. 5, 2021, Bloom Energy Corporation.

Notification Concerning Transmittal of Copy of the International Preliminary Report on Patentability and the Written Opinion of the International Searching Authority for International Patent Application No. PCTUS2021/051926, dated Apr. 6, 2023, 6 pages.

* cited by examiner

USE OF HYDROGEN AND LIQUID NATURAL GAS HYBRID FUEL IN MARINE APPLICATIONS TO REDUCE CARBON FOOTPRINT

FIELD

The present disclosure relates to ship power generation systems in general, and to hydrogen fueled power generation systems in particular.

BACKGROUND

The shipping industry is gearing up to meet new IMO (International Marine Organization) targets of reducing emissions by 40% by 2030. The marine industry is searching for solutions to meet the short-term as well as long-term emission reduction targets for the new vessels as well as existing vessels. There are 100,000+ existing vessels which will need to catch-up to the IMO requirements.

SUMMARY

In one embodiment, a method of operating a vessel includes providing hydrogen or a fuel mixture containing hydrogen and a hydrocarbon fuel to a power generator disposed on the vessel, and providing power from the power generator to an electrical load of the vessel.

In another embodiment a vessel includes a hull, a deck, an electrical load, a hydrogen tank, and a power generator configured to receive hydrogen from the hydrogen tank or a fuel mixture comprising hydrogen and a hydrocarbon fuel and to provide power to the electrical load.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, 5 to 10%. In addition, weight percentages (wt. %) and atomic percentages (at. %) as used herein respectively refer to a percent of total weight or a percent of a total number of atoms of a corresponding composition.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Figure 1:
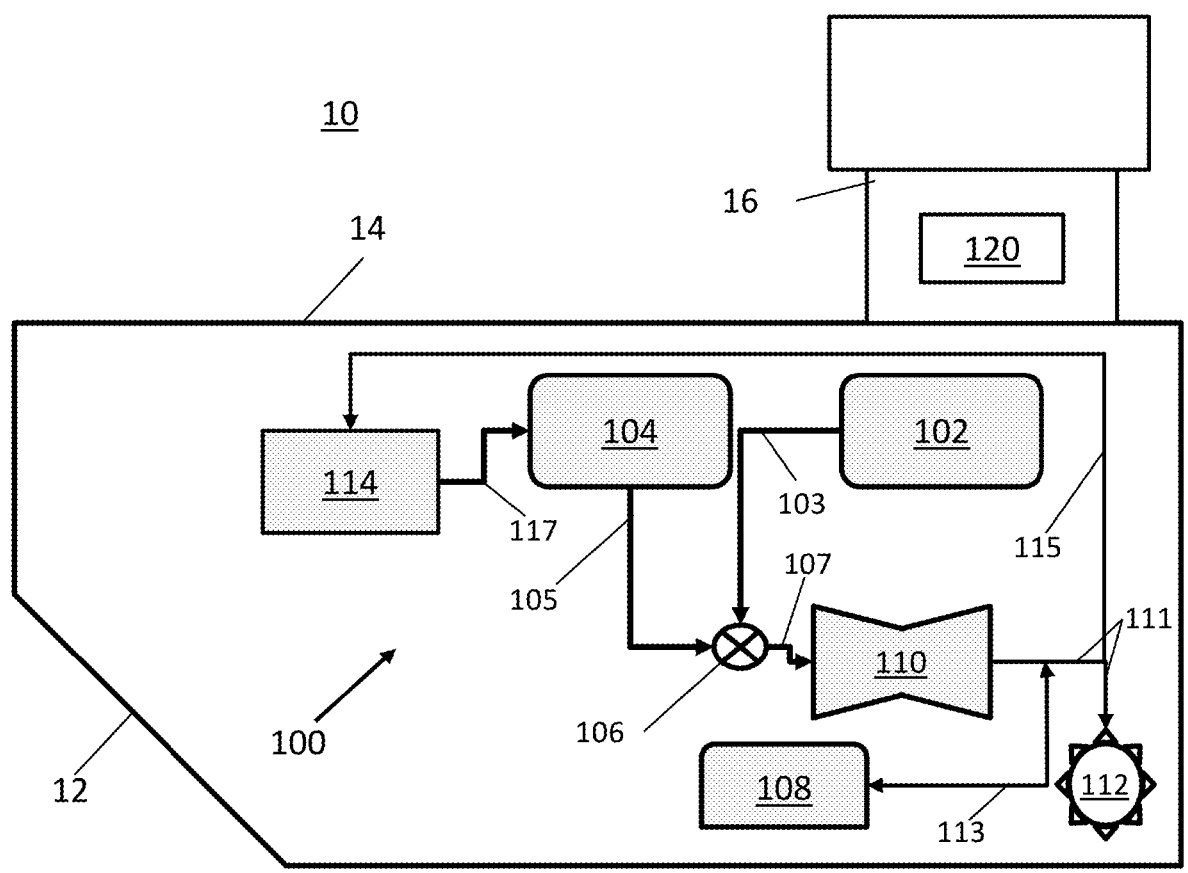
FIG. 1 is a schematic view of a vessel including a hybrid power system, according to various embodiments of the present disclosure.

In one embodiment shown in FIG. 1, a method of operating a vessel (i.e., ship) 10 comprises using a fuel comprising pure hydrogen or a blend of hydrogen with another fuel to power the marine vessel. The terms "vessel" and "ship" are used interchangeably herein. The vessel or ship may transport freight and/or passengers. The vessel 10 may include a hull 12 and a deck 14. The vessel 10 may also include a bridge 16. In one embodiment, the vessel 10 may be a marine vessel configured to operate in seas and oceans. However, vessels 10 configured to operate in rivers and lakes may also be used.

In one embodiment, the hydrogen is stored on the vessel. In another embodiment, the hydrogen is generated on the vessel using electrolysis. For example, the hydrogen is generated by solid oxide electrolysis cells (i.e., a solid oxide electrolyzer). In one embodiment, a blend of the hydrogen and liquid natural gas is used to power the vessel. The blend may include 10 to 90 volume percent hydrogen. In one embodiment, the fuel is provided to a solid oxide fuel cell power generation system to generate electrical power for the vessel.

Various embodiments of the present disclosure apply to the entire marine sector to use blends of various fuel types, with or without existing diesel fuel, to lower carbon (e.g., greenhouse gas) emissions. For example, various embodiments provide vessel hybrid power systems that utilize hydrogen to reduce vessel carbon emissions.

FIG. 1 is a schematic view of the vessel 10 containing a vessel power system 100, according to various embodiments of the present disclosure. In one embodiment, the vessel 10 may comprise a marine vessel and vessel power system 100 may comprise a marine vessel power system located in the hull 12 and/or on the deck 14 of the vessel 10. Referring to FIG. 1, the power system 100 may include an optional fuel tank 102, a hydrogen tank 104, a fuel valve 106, energy storage device 108, a generator (i.e., a power generator) 110, an optional hydrogen generator 114 and a controller 120.

The fuel tank 102 may be configured to store a hydrocarbon fuel, such as liquefied natural gas (LNG), marine diesel, etc. However, the present disclosure is not limited to any particular type of hydrocarbon fuel. In one embodiment, the fuel tank 102 may be omitted if the vessel is configured to operate on only hydrogen as fuel. The hydrogen tank 104 may be configured to store hydrogen ($H_2$), which may be generated onboard or provided from an external source, such as a container ship or port generation or storage facility. The hydrogen tank may be a gas storage cylinder which may optionally contain a hydrogen storage medium which adsorbs hydrogen.

It is believed that hydrogen made via conventional steam-methane reformation (SMR) reaction processes results in the generation of significant carbon emissions. Accordingly, in some embodiments, the hydrogen provided to the hydrogen tank 104 may be "green hydrogen" generated using low carbon power sources, such as solar power, wind power, hydroelectric power, nuclear power, or the like, in order to reduce total carbon emissions.

In various embodiments, the fuel tank 102 and/or hydrogen tank 104 may include pumps and/or flow control valves (e.g., two-way valves) in order to control flow rates of hydrogen and hydrocarbon fuel provided via the respective fuel and hydrogen flow conduits (e.g., pipes or manifolds) 103 and 105 to the fuel valve 106 and/or generator 110. The fuel valve 106 may be a three-way valve that is configured to control a hydrogen to hydrocarbon ratio of fuel provided to the generator 110 via the inlet flow conduit (e.g., pipe or manifold) 107.

The energy storage device 108 may comprise any device configured to store electrical energy, such as a battery (e.g., battery bank), a supercapacitor, a flywheel, etc. The energy storage device 108 may be electrically connected to the load power bus 111 by an electrical connection (e.g., power bus) 113.

The generator 110 may be an electrical generator configured to provide power to vessel's onboard electrical load 112, such as propulsion systems and/or general electrical loads, using the power bus 111. In some embodiments, the generator 110 may be a combustion type generator, such as a turbine or reciprocating piston engine. In other embodiments, the generator 110 may be a fuel cell system, such as a solid oxide fuel cell (SOFC) system. In yet other embodiments, the generator 110 may include both a fuel cell system and a combustion type generator, such as a turbine or reciprocating piston engine. The generator 110 may be configured to operate using the hydrocarbon fuel stored in the fuel tank 102, the hydrogen stored in the hydrogen tank 104, and mixtures thereof.

Marine vessels have may have various operating modes such as a cold start mode, a port docking mode, a transit/maneuvering mode, and a cargo loading/unloading mode. The magnitude of a load 112 applied to the generator 110 may be different for each mode. In addition, local and international emission requirements may impose unique constraints on vessel operations and/or emissions. For example, carbon emission limits may be lower near landmasses and/or in port than in the open ocean. In addition, carbon emission limits may be different for each operating mode.

Accordingly, the controller 120 may be a central processing unit or the like configured to control the operation of the power system 100, based on the operating mode and/or applicable emissions limits. For example, the controller 120 may be configured to control the energy storage device 108, the generator 110, the hydrogen generator 114 and/or the fuel valve 106, based on a magnitude of the load 112 and/or applicable carbon emission limits.

For example, in some embodiments, the controller 120 may be configured to add hydrogen to the hydrocarbon fuel, to form a fuel mixture configured to reduce vessel carbon emissions, in order to comply with the local authorities having jurisdiction or international emission requirements. The controller 120 may be configured to adjust the fuel valve 106 in order to control the relative amounts of hydrogen and hydrocarbon fuel that are included in a fuel mixture provided to the generator 110. In some embodiments, a fuel mixture provided to the generator may include from about 0 to about 90 volume percent (vol. %), such as from about 10 to about 90 vol. % hydrogen, and from about 100 vol. % to about 10 vol. %, such as from about 90 to about 10 vol. % hydrocarbon fuel.

For example, the controller 120 may be configured to determine an amount of hydrogen that is mixed with the hydrocarbon fuel, in order to form a fuel mixture configured to satisfy the emissions requirements of a given jurisdiction, while at the same time minimizing overall fuel costs. For example, since hydrogen may currently be more expensive to produce than a hydrocarbon fuel, such as LNG, the controller 120 may be configured to utilize only an amount of hydrogen that is necessary to meet applicable emission requirements, such as carbon emission requirements, when forming a fuel mixture. In various embodiments, the controller 120 may utilize global positioning system (GPS) coordinates of the vessel and a lookup table, in order to determine what emission requirements currently apply to the vessel.

In some embodiments, such as if the power requirements are relatively low, such as if the vessel 100 is operating in the port docking mode, the controller 120 may be configured to utilize power stored in the energy storage device 108 and/or electrical power provided by port electrical facilities, to power the load 112. In the alternative, hydrogen provided by port facilities (e.g., via flexible hose connections) may be used to operate the generator 110, in order to provide power to the load 112.

In some embodiments, the power system 100 may optionally include a hydrogen generator 114. For example, the hydrogen generator 114 may comprises a solid oxide electrolysis cell (SOEC) system configured to produce hydrogen by electrolysis of water. For example, the hydrogen generator 114 may be operated using power provided by the generator 110 and/or power provided by port facilities. For example, while in port, the vessel may be provided with power from on-shore green energy sources, such as solar, wind, tidal, or nuclear power sources. In some embodiments, the generator 110 may be used to provide power to the hydrogen generator 114 via an electrical connection (e.g., power bus) 115, such as during transit through areas having less restrictive emissions requirements. The hydrogen generated by the hydrogen generator 114 may be provided to the hydrogen tank 104 via a hydrogen inlet conduit (e.g., pipe or manifold) 117 which connects the outlet of the hydrogen generator 114 to an inlet of the hydrogen tank 104. The stored hydrogen may be provided from the hydrogen tank 104 to the generator 110 via conduit 105 during vessel 10 operation in locations where reduced carbon emissions are required.

Figure 2:
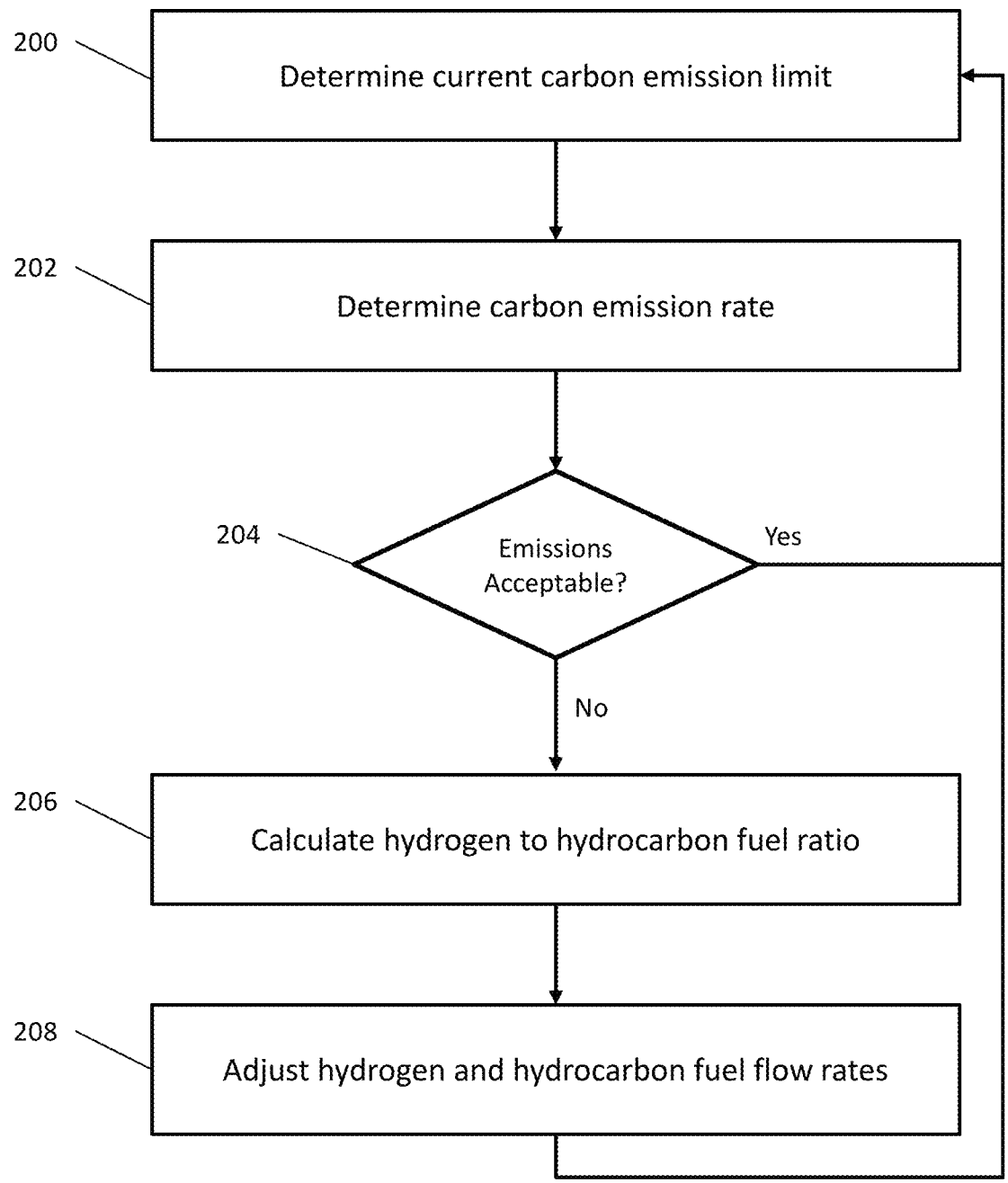
FIG. 2 is a flow chart illustrating the steps of a method of controlling vessel emissions, according to various embodiments of the present disclosure.

FIG. 2 is a flow chart illustrating the steps of a method of operating a vessel 10 including a hybrid power system 100 as shown in FIG. 1, according to various embodiments of the present disclosure. Referring to FIGS. 1 and 2, in step 200 a carbon emission limit for the vessel 10 may be determined may be determined. For example, the controller 120 may identify applicable jurisdictional carbon emission regulations, based on a current location of the vessel, which may be identified based on GPS coordinates of the vessel. The carbon emission limit may be determined based on the current operating mode of the vessel and/or a corresponding carbon emission limit and/or emission rate specified in the applicable emission regulations. The emission regulations may include local emissions regulations and/or International Marine Organization targets. In the alternative, a carbon emission rate may be manually set by an operator of the vessel.

In step 202, a current carbon emission rate may be determined. For example, the carbon emission rate may be determined based on a current rate of hydrocarbon fuel consumption by the vessel, and a corresponding carbon emission rate.

In step 204, the controller 120 may compare the current carbon emission rate to the determined carbon emission limit, in order to determine whether the current carbon emissions are below the emission limit, and thus acceptable. If the carbon emission rate is less than the determined carbon emission limit, the method may return to step 200. If the carbon emission rate exceeds the emissions limit, the method may proceed to step 206.

In step 206, the controller 120 may calculate a hydrogen to hydrocarbon fuel ratio, based on the determined carbon emission limit and the current power requirements of the vessel. (e.g., current vessel operating mode power loads). For example, the controller 120 may increase the hydrogen to hydrocarbon fuel ratio provided to the generator 110, in order to form a fuel mixture configured to decrease carbon emissions. In particular, the controller 120 may determine the power demand magnitude of the load 112 based on the present operating mode, and then calculate a corresponding hydrogen to hydrocarbon fuel ratio and a total fuel mixture flow rate, based on the estimated power magnitude of the load 112.

For example, in some embodiments, the controller 120 may calculate a maximum amount hydrocarbon fuel that may be used by the generator 110, without carbon emissions of the generator 110 exceeding the carbon emission limit. The controller 120 may then calculate a corresponding hydrocarbon power output of the generator. The controller 120 may then calculate an amount of hydrogen required to increase the power output of the generator by an amount equal to a difference between the hydrocarbon power output and the magnitude of the load. The controller 120 may then calculate an amount of hydrogen to be added to the hydrocarbon fuel, in order to form a fuel mixture that is configured to generate an amount of power sufficient to meet the power demand of the load 112, and an amount of carbon emission that is less than the carbon emission limit.

In some embodiments, the power generated by the generator 110 may be supplemented by power stored in the energy storage device 108, such that the amount of hydrocarbon fuel and/or hydrogen provided to the generator 110 may be reduced. Accordingly, the controller 120 may calculate the hydrogen to hydrocarbon fuel ratio, based on a state of charge of the device 108 and a corresponding reduction in the magnitude of the load 112, due to power provided from the device 108 to the load 112.

In step 208, the controller 120 may adjust the flow rates of the hydrogen and hydrocarbon fuel used to form a fuel mixture that is provided to the generator 110, based on the calculated hydrogen to hydrocarbon fuel ratio. For example, the controller 120 may control the fuel valve 106, in order to adjust the relative hydrogen and hydrocarbon fuel flow rates to the generator 110, in order achieve a corresponding level of carbon emission and power output from the generator 110. In one embodiment, the generator 110 may be operated on hydrogen fuel only. In this case, the hydrogen to hydrocarbon fuel ratio is represented by a specific value or code to avoid division by zero.

In some embodiments, the generator 110 may include a SOFC system and the hydrocarbon fuel may be natural gas, such as liquid natural gas. The controller may control the fuel valve 106, in order to adjust the relative hydrogen and hydrocarbon fuel flow rates (e.g., hydrogen to hydrocarbon fuel ratio) to the generator 110, in order achieve a corresponding level of carbon emission from the generator 110.

In various embodiments, the generator 110 may generate power in excess of the power demand of the load 112, while still emitting carbon at a level less than the applicable carbon emission limit. In such circumstances, the controller 120 may provide the excess power from the generator 110 to the hydrogen generator 114 and/or to the energy storage device 108. Hydrogen generated by the hydrogen generator 114 may be stored in the hydrogen tank 104 for later use.

This approach captures novel way to use a blend of fuels, at opportune time, aligned with specific vessel operating modes, to lower carbon emissions. Use of different fuel types may be used to reduce the emission foot print of the older and the new vessel or fleet of vessels.

The controller 120 described herein, may be implemented using computing devices (such as computer) that include programmable processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a control device that may be or include a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use any of the described embodiments. Various modifications to these embodiments will be readily apparent to those skilled in the art, and the generic principles defined herein may be applied to other embodiments without departing from the scope of the disclosure. Thus, the claims are not intended to be limited to the embodiments shown herein but are to be accorded the widest scope consistent with the claim language and the principles and novel features disclosed herein.

The invention claimed is:

1. A method of operating a vessel, comprising:
   determining a carbon emission limit applicable to the vessel based on a present location of the vessel;
   determining a power demand magnitude of an electrical load applied to a power generator disposed on the vessel;
   calculating a hydrogen to hydrocarbon ratio based on the carbon emission limit and the power demand magnitude of the electrical load;
   forming a fuel mixture by adding hydrogen to a hydrocarbon fuel, such that the fuel mixture has the calculated hydrogen to hydrocarbon ratio;
   providing the fuel mixture to the power generator; and
   providing power from the power generator to the electrical load.

2. The method of claim 1, wherein the hydrogen is stored on the vessel.

3. The method of claim 1, further comprising generating the hydrogen on the vessel using electrolysis.

4. The method of claim 3, wherein:
   the step of generating the hydrogen on the vessel comprises using solid oxide electrolysis cells to generate the hydrogen from water; and
   the solid oxide electrolysis cells are powered by the power generator.

5. The method of claim 1, wherein the power generator comprises a solid oxide fuel cell power generation system and the vessel comprises a marine vessel.

6. The method of claim 1, wherein the power generator comprises a gas turbine or a reciprocating piston engine.

7. The method of claim 1, wherein:
   the fuel mixture comprises from 10 to 90 volume percent hydrogen, and from 10 to 90 volume percent of the hydrocarbon fuel; and
   the hydrocarbon fuel comprises natural gas.

8. The method of claim 1, further comprising using electrical power stored onboard of the vessel to reduce the power demand magnitude of the electrical load prior to the calculating a hydrogen to hydrocarbon ratio.

9. The method of claim 1, wherein the calculating the hydrogen to hydrocarbon ratio comprises:
   calculating a maximum amount hydrocarbon fuel that may be used by the power generator without carbon emissions of the power generator exceeding the carbon emission limit and a corresponding hydrocarbon power output of the power generator; and
   calculating an amount of hydrogen required to increase the power output of the power generator by an amount equal to a difference between the hydrocarbon power output and the power demand magnitude of the electrical load.

10. A vessel, comprising:
    a hull;
    a deck;
    an electrical load;
    a hydrogen tank;
    a hydrocarbon fuel tank;
    a power generator configured to receive a fuel mixture comprising hydrogen from the hydrogen tank and a hydrocarbon fuel from the hydrocarbon fuel tank and to provide power to the electrical load; and
    a controller configured to:
       determine a carbon emission limit applicable to the vessel based on a present location of the vessel;
       determine a power demand magnitude of the electrical load applied to the power generator;
       calculate a hydrogen to hydrocarbon ratio based on the carbon emission limit and the power demand magnitude of the electrical load; and
       control hydrogen flow from the hydrogen tank and hydrocarbon fuel flow from the hydrocarbon fuel tank such that the fuel mixture provided to the generator that has the calculated hydrogen to hydrocarbon ratio.

11. The vessel of claim 10, further comprising:
    a hydrogen generator electrically connected to the power generator and configured to generate the hydrogen; and
    a hydrogen inlet conduit which connects an outlet of the hydrogen generator to an inlet of the hydrogen tank.

12. The vessel of claim 11, wherein the hydrogen generator comprises solid oxide electrolysis cells.

13. The vessel of claim 10, wherein the power generator comprises a solid oxide fuel cell power generation system and the vessel comprises a marine vessel.

14. The vessel of claim 10, wherein the power generator comprises a gas turbine or a reciprocating piston engine.

15. The vessel of claim 10, wherein the controller is configured to calculate the hydrogen to hydrocarbon ratio by:
    calculating a maximum amount hydrocarbon fuel that may be used by the power generator without carbon emissions of the power generator exceeding the carbon emission limit and a corresponding hydrocarbon power output of the power generator; and
    calculating an amount of hydrogen required to increase the power output of the power generator by an amount equal to a difference between the hydrocarbon power output and the power demand magnitude of the electrical load.

16. The vessel of claim 10, further comprising an energy storage device electrically connected to a power bus connecting the power generator and the electrical load.

* * * * *